(12) United States Patent
Au (10) Patent No.: US 10,185,621 B2
(45) Date of Patent: Jan. 22, 2019

(54) METHOD AND APPARATUS FOR PROVIDING A DISPLAY STREAM EMBEDDED WITH NON-DISPLAY DATA

(71) Applicant: ATI TECHNOLOGIES ULC, Markham (CA)

(72) Inventor: Dennis Au, Toronto (CA)

(73) Assignee: ATI Technologies ULD, Markham, Ontario (CA)

( * ) Notice: Subject to any disclaimer, the term of this patent is extended or adjusted under 35 U.S.C. 154(b) by 0 days.

(21) Appl. No.: 14/282,275

(22) Filed: May 20, 2014

(65) Prior Publication Data

US 2014/0344650 A1 Nov. 20, 2014

Related U.S. Application Data

(60) Provisional application No. 61/825,393, filed on May 20, 2013.

(51) Int. Cl.
*G06F 11/10* (2006.01)
*H04N 17/00* (2006.01)
*H04N 7/10* (2006.01)
*H04L 1/00* (2006.01)

(52) U.S. Cl.
CPC .............. *G06F 11/10* (2013.01); *H04L 1/00* (2013.01); *H04N 7/10* (2013.01); *H04N 17/00* (2013.01); *H04N 17/004* (2013.01)

(58) Field of Classification Search
CPC .......... G06F 11/10; H04N 17/00; H04N 7/10; H04N 17/004; H04L 1/00
See application file for complete search history.

(56) References Cited

U.S. PATENT DOCUMENTS

| | | | | |
|---|---|---|---|---|
| 4,847,840 A | * | 7/1989 | Jinguji | G11B 20/1833 714/699 |
| 6,213,879 B1 | * | 4/2001 | Niizuma | H04L 7/0008 463/36 |
| 2008/0162071 A1 | * | 7/2008 | Stevens | G01R 31/31705 702/122 |
| 2008/0273602 A1 | * | 11/2008 | Glen | H04B 1/74 375/257 |
| 2012/0151263 A1 | | 6/2012 | Rentschler et al. | |
| 2013/0254604 A1 | * | 9/2013 | Whitby-Strevens | H04L 1/00 714/704 |
| 2014/0101468 A1 | * | 4/2014 | Narayanan | G06F 1/266 713/320 |

* cited by examiner

*Primary Examiner* — Kyle Vallecillo
(74) *Attorney, Agent, or Firm* — Faegre Baker Daniels LLP (57) ABSTRACT

A video device having data lanes and a method of operating the video device includes obtaining a stream of debug data in response to a test operation, framing the stream of debug data independent of establishing a video blanking period, and transmitting the framed stream of debug data across one or more data lanes of the video link for operation between a video source device and a video sink device. The method also includes generating a stream of video data related to the test operation, framing the stream of video data to establish a video blanking period, and transmitting the framed stream of debug data concurrently with the framed stream of video data across the one or more data lanes of the video link.

24 Claims, 9 Drawing Sheets

METHOD AND APPARATUS FOR PROVIDING A DISPLAY STREAM EMBEDDED WITH NON-DISPLAY DATA

RELATED APPLICATIONS

This application claims priority to Provisional Application Ser. No. 61/825,393, filed on May 20, 2013, having inventor Dennis Au, titled "METHOD AND APPARATUS FOR PROVIDING A DISPLAY STREAM EMBEDDED WITH NON-DISPLAY DATA", and is incorporated herein by reference.

BACKGROUND OF THE DISCLOSURE

The disclosure is related to methods and devices for providing data transmission between video source and sink hardware. The present disclosure is related more specifically to methods and devices for providing high speed data transmission of non-display related data along with video data over a unified cable.

Multi-stream transport (MST) architecture, such as DisplayPort™, provides an AC-coupled voltage-differential interface. The interface consists of three different channels: a main link, an AUX channel, and a hot plug detect (HPD). The main link features one, two or four scalable data pairs (or lanes) that can be operated at different rates (Gbit/sec). The main link lanes and the AUX channel are differential signals formed from twisted pairs of lines and the HPD is a single wire. MST utilizes a link service within a source device to discover, configure and maintain a link with devices it connects to. The link service configures the link through as link training. Link training is a process where the correct number of lanes are enabled and the signals are tuned at the required link rate via a handshake between the MST transmitter (graphics output) and the MST receiver (repeater, hub or display) over the AUX channel.

MST control symbols are used for data such as video into display frame information. For each scan line, for example, a blanking start (BS) control symbol is sent that indicates, for example, where the last video data transfer unit ends. Data is sent as transfer units (micropackets). Blanking end (BE) information indicates where the first video data transfer unit begins for a display line, fill start (FS) information indicates where dummy data symbols start in each transfer unit and fill end and other symbols are also utilized. Control data is also sent as part of every frame, sent in a given lane and follows the blanking start (BS) information. Such blanking start information as noted above, indicates, for example, the end of a scan line. Control data includes, for example, information regarding video and audio and timing information, such as display frame, field or scan line information and related timing information. As such, redundant control symbols and control data is sent over multiple lanes. The last symbol time for a line of pixel data is followed by the control symbol BS which is inserted on all lanes of the link.

Technology has been developed under the name Thunderbolt™ which combines PCI Express and DisplayPort™ into a serial data interface. Thunderbolt provides bi-directional data communication that requires an active cable, i.e. copper cables that use silicon chips in the connectors to boost the performance of the cable. The cable has high speed differential pairs of wires for data flow in each direction along with wiring for management purposes. The active nature of the cable and the hardware controllers to handle the data cause the Thunderbolt solution to be relatively expensive. There also exists technology which modifies the physical layer of the AUX channel to permit high-speed bi-directional data transmission. This allows for bi-directional transmission speeds similar to that of the main link, but as mention requires a physical modification to the DisplayPort™ architecture which can be costly.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF EMBODIMENTS

Briefly, apparatus and methods are disclosed that provide obtaining a stream of debug data and/or performance data in response to a test operation. The stream of debug data is framed independent of establishing a video blanking period. In contrast, video data is typically framed with a video blanking period to identify individual frames of a video sequence. The stream of debug data, which is framed independent of establishing a video blanking period, is then transmitted across one or more data lanes of a video link. A stream of video which is related to the test operation can be generated and is framed to establish a video blanking period. The framed stream of debug and the framed stream of video data can be transmitted concurrently across the one or more data lanes of the video link.

In an exemplary and non-limited embodiment, aspects of the disclosure are embodied in a method and apparatus that in response to a test operation, frame a stream of debug data independent of establishing a video blanking period, and transmit the framed stream of debug data across one or more data lanes of a video link. A video sink device or receiving device and method receives the framed stream of debug data across one or more data lanes of the video link, the framed stream of debug data being independent of a video blanking period, decodes the framed stream of debug data and supplies the decoded stream of debug data to a sink device.

Among the advantages, the apparatus and methods can transmit the debug and/or performance data in real-time via multi-stream transport (MST) across the data lanes of the video link concurrently with the stream of video and, additionally, audio data all of which can correspond with the test operation. Another advantage relies in that the stream of debug data is framed using a limited number of control symbols whereas framing video data, e.g. to establish a video blanking period, may require more control symbols than is used to frame the debug and thus requires greater bandwidth. Therefore, the stream debug data can be framed to optimize bandwidth and provide the debug data concurrently with the video data in real-time. Furthermore, by reducing the number of control symbols used to frame the stream of debug data the complexity of the hardware tasked with encoding the debug data with control symbols and decode the framed debug data is reduced.

In some embodiments, a method of operating video device having data lanes includes receiving a framed stream of debug data across one or more data lanes of the video link for operation between a video source device and a video sink device, the framed stream of debug data being independent of a video blanking period, decoding the framed stream of debug data independent of the framing, and supplying the decoded stream of debug data to a debug sink device. The method also includes receiving a framed stream of video data and the framed stream of debug data concurrently across the one or more data lanes of the video link, decoding the framed stream of video data, and supplying the decoded stream of video data to a video sink device.

In some embodiments, a video device having data lanes includes a communication bridge configured to obtain a stream of debug data in response to a test operation, a debug data encoder configured to frame the stream of debug data independent of establishing a video blanking period, and a multi-stream transmitter is configured to transmit the framed stream of debug data across one or more data lanes of a video link for operation between a video source and a video sink. The video device also includes a video source configured to generate a stream of video data related to the test operation, and wherein the multi-stream transmitter is configured to receive the stream of video data, frame the stream of video data to establish a video blanking period, and transmit the framed stream of debug data concurrently with the framed stream of video data across the one or more data lanes of the video link.

In some embodiments, a video device having data lanes includes a multi-stream receiver configured to receive a framed stream of debug data across one or more data lanes of a video link for operation between a video source device and a video sink device, the framed stream of debug being independent of an established video blanking period, and a debug data decoder configured to decode the framed stream of debug data independent of the framing and supply the stream of debug data to a debug data sink device. The multi-stream receiver is also configured to configured to receive a framed stream of video data and the framed stream of debug data concurrently across the one or more data lanes of the video link, decode the framed stream of video data according to an established video blanking period, and supply the decoded stream of video data to a video sink device.

In some embodiments, a method of operating a video device having data lanes includes, during a normal mode of operation, generating a stream of video data, framing the stream of video data to establish a video blanking period, and transmitting the framed stream of video data to a video sink device across one or more data lanes of the video link, and, during a debug mode, obtaining a stream of debug data in response to a test operation, framing the stream of debug data independent of establishing a video blanking period, and transmitting the framed stream of debug data to a debug sink device across the one or more data lanes of the video link. The method also includes, during the debug mode, generating a stream of video data, framing the stream of video data to establish a video blanking period, and transmitting the framed stream of video data and the framed stream of debug data to a video sink device and a debug sink device, respectively, concurrently across one or more data lanes of the video link.

In some embodiments, a computer readable medium containing non-transitory instructions thereon, that when interpreted by at least one processor, cause the at least one processor to obtain a stream of debug data in response to a test operation, frame the stream of debug data independent of establishing a video blanking period, and transmit the framed stream of debug data across one or more data lanes of a video link for operation between a video source device and a video sink device. The a computer readable medium also includes instructions to generate a stream of video data related to the test operation, frame the stream of video data to establish a video blanking period, and transmit the framed stream of debug data concurrently with the stream of video data across the one or more data lanes of the video link.

In some embodiments, a storage medium that comprises executable instructions thereon that when executed by an integrated circuit fabrication system, causes the system to form an integrated circuit of a video device that includes a communication bridge configured to obtain a stream of debug data in response to a test operation, a debug data encoder configured to frame the stream of debug data independent of establishing a video blanking period, and a multi-stream transmitter is configured to transmit the framed stream of debug data across one or more data lanes of a video link for operation between a video source and a video sink. The storage medium also includes instructions to form an integrated circuit including a multi-stream receiver configured to receive a framed stream of debug data across one or more data lanes of a video link for operation between a video source device and a video sink device, the framed stream of debug being independent of an established video blanking period, and a debug data decoder configured to decode the framed stream of debug data independent of the framing and supply the stream of debug data to a debug data sink device.

Figure 1:
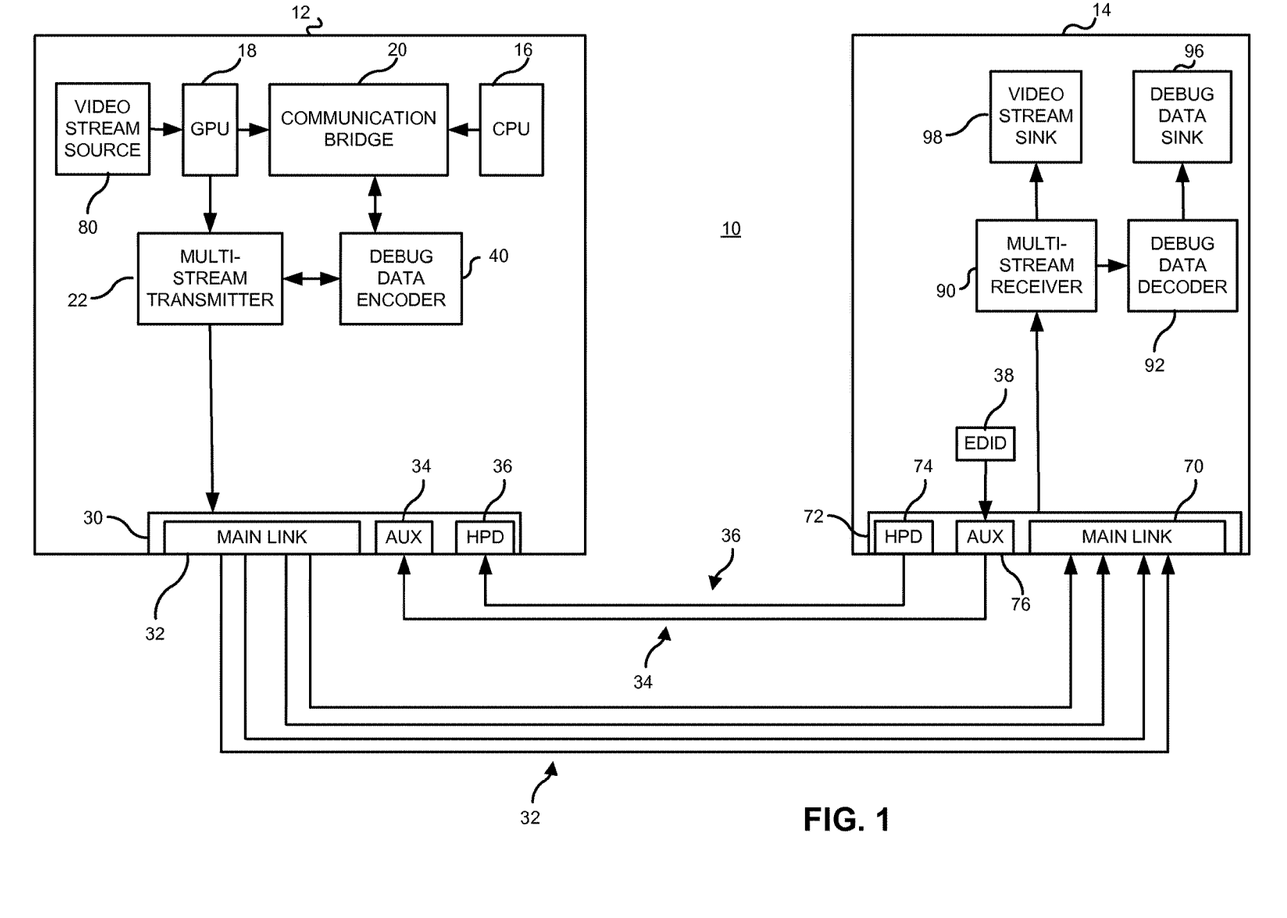
FIG. 1 is a block diagram illustrating one example of an embodiment employing an integrated circuit.

FIG. 1 illustrates one example of a video device 10 that includes a first device such as a video and/or audio source devices that provides a source of audio and/or video or other suitable information to be communicated to the second device 14, such as an LCD display, digital television, handheld device, or any other suitable device operable to receive the information communicated by the first device 12. The first device 12 includes circuitry, such as one or more central processing units (CPU) 16, one or more graphics processing units (GPU) 18, and an integrated circuit 20 which handles communication or between or obtains data from the CPU 16, GPU 18, and other integrated devices such as, but not limited to, random access memory (RAM) and corresponding controllers, PCI Express (or AGP) devices, or the like of the video device 10. The integrated circuit 20 may include a communication bridge, such as a universal northbridge, which obtains data from the various components of the video device 10. The integrated circuit 20 may be referred to as a communication bridge hereon.

The GPU 18 and communication bridge 20 are coupled to a multi-stream transmitter 22, e.g. of the type compliant with the DisplayPort™ standard, which provides control symbols, control data, and video and/or data for concurrent and/or simultaneous transmission over a plurality of respective data lanes to a video sink device 24 of the second device 14. The CPU 16, GPU 18, communication bridge 20, multi-stream transmitter 98, and the like can be part of a single integrated circuit disposed on a single die or a plurality of discrete integrated circuits interconnected by wire traces on a printed circuit board as part of the first device 12.

Generally, the DisplayPort™ standard defines a digital display interface standard that may connect, for example, a video and/or audio source device and its corresponding display monitor. For example, one or more video sources and corresponding display monitors may be connected via the DisplayPort™ communication interface in a home theater system, computer system or any other suitable system. A DisplayPort™ connector may support 1 to 4 data pairs that also carry audio and clock signals with link or transfer rates of, for example, 1.62 or 2.7 gigabits per second. A bi-directional auxiliary channel runs at a constant 1 megabit per second rate and serves as a main link management and device control using VESA EDID and VESA MCCS standards. A single cable may be used to support, for example, 10 gigabit per second forward link channel high resolution monitors for high definition video. A DisplayPort™ connection may consist of, for example, three components in a physical layer 30 such as the main link 32, the auxiliary channel (AUX) 34, and the hot plug detect signal line (HPD) 36. The HPD 36 only carries data in one direction, from the sink device (receiving device) to the source device (transmitting device). When a user connects devices using a DisplayPort™ communication interface, the HPD signal is used in the initiation of the exchange of data. The HPD can also be used as an interrupt line to allow the receiver to get the attention of the transmitter.

The AUX channel 34 offers bi-directional data signals with a 1 megabit per second data rate and data sent over this channel is involved in managing the link and device control. The main link 32 data lanes may be used at various link rates, i.e. to send different speeds of information such as video, audio, and data, depending upon the quality of the connecting cable and the capabilities of the source and receiving devices, i.e. the first device 12 and second device 14, respectively. However, the same link rate is used for all lanes once designated. Devices can use, for example, 1, 2 or 4 lanes. The link rate (transmission speed) and a number of lanes in use may depend on the needs of the second device 14. The main link 32 can carry data in only one direction from the video stream source 80 to the video stream sink 98. The DisplayPort™ system is a digital display interface and in the main link 32, each data lane is a differential pair. The first device 12 serves as a master and the auxiliary channel is used to program the mode of the DisplayPort™ receivers to 1, 2 or 4 data lanes along with link rates and color depths. The first device 12 can read a register with, for example, extended display identification data, EDID 38, in the second device 14 and to instruct the multi-stream transmitter 22 to configure the main link 32 according to this information. The main link 32 utilizes encoding which, for example, translates an 8 bit byte to a 10 bit code and there may be, for example, 1,024 10 bit codes but only 256 data codes may be validated codes. There are also ten or so command codes, such as blank start (BS) and blank end (BE) which define a video blanking period or fill start (FS) and fill end (FE) which define stuffing symbols. Data symbols and control symbols are sent as part of the communication protocol. Details of one example of a DisplayPort™ proposal may be found, for example, in the DisplayPort™ Spec 1.2 incorporated herein by reference.

The first device 12 may be any suitable device including, but not limited to, a laptop computer, tablet computer, desktop computer, video game console system, cell phone, smart phone, tablet, digital audio player, digital video player, such as but not limited to, DVD players, CD ROM players, cable TV card, satellite TV card, or any other suitable device that provides audio and/or video data or any other suitable data as desired, that is communicated to the second device 14.

The stream of debug data is framed to be compatible with multi-stream transport standards in order to take advantage of the high bandwidth capabilities of the multi-stream transport link rate, e.g. 1.62 or 2.7 gigabits per second. The framed stream of debug data can be transmitted to a debug sink device 96 of the second device 14 in real-time as a test operation is being performed on the first device 12. For example, the second device 14 can be a display device which displays the stream of debug data in real-time as the test operation is being performed on the first device 12.

The first device 12 includes a debug data encoder 40 which frames a stream of debug data for transmission across the one or more data lanes of the main link 32 independent of establishing a video blanking period, e.g. a horizontal video blanking interval or a vertical video blanking interval. The debug data encoder 40 provides a mechanism to stream performance and debug data, alike, from the first device 12 in real-time without being limited by any on chip data structure limitations, i.e. size, speed, framing, etc., in a manner that is non-invasive to the operation of the multi-stream transmitter 22 and corresponding physical layer 30. The multi-stream transmitter 22 outputs the framed stream of debug data in a multi-stream transport mode (MST) that sends multiple data streams (e.g. video, audio, and data) concurrently and/or simultaneously from the first device 12, e.g. the video source 80, to the second device 14, e.g. video sink device such as a debug device configured to decode, interpret, and/or display the stream of debug data transmitted across the main link 32 concurrently or simultaneously with a stream of video and/or audio data.

Figure 2:
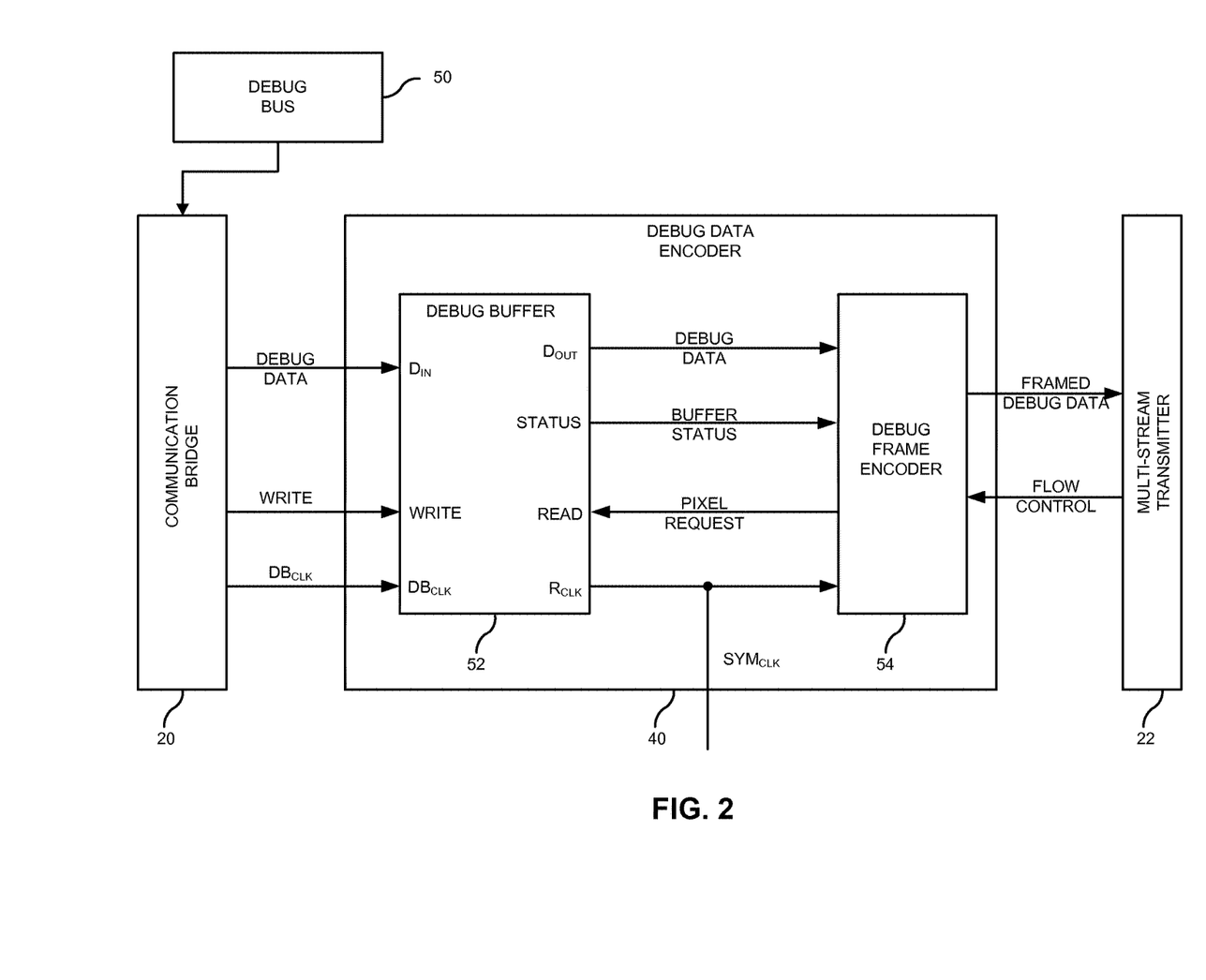
FIG. 2 illustrates one example of an integrated circuit, in accordance with some embodiments.

FIG. 2 illustrates one example of the debug data encoder 40. The communication bridge obtains or receives performance and/or debug data from various components of the first device, e.g. the CPU 16, GPU 18, memory controllers, temperature sensors, and the like, over a debug bus 50 having an interface with a known bandwidth such as, but not limited to, 64-bits. The stream of debug data is obtained in response to a test operation. The debug data obtained by the communication bridge 20 is transferred to a debug buffer 52 of the debug data encoder 40. The debug buffer 52 can be an asynchronous first-in-first-out (FIFO) memory buffer which operates independent of a debug clock signal $DB_{CLK}$ and a multi-stream transmitter clock signal $SYM_{CLK}$. The $DB_{CLK}$ signal corresponds to a clock signal associated with the debug bus 50, while the $SYM_{CLK}$ signal corresponds to a clock signal associated with the multi-stream transmitter. It should be noted that these two clock signal can operate at the same or difference clock frequencies. Debug buffer 52 write rate is automatically regulated by the communication bridge 20 using the WRITE signal to prevent write overflow based on the flow rate of the stream of debug data obtained from the debug bus 50. In various embodiments, the flow rate of the stream of debug data can be manually adjusted by a user or the flow can be adjusted according to an error correction code, which will be described in further detail. Although the stream of debug data should not overflow the debug buffer 52 under normal conditions, the WRITE signal to the debug buffer 52 can be stalled when the debug buffer 52 is full which allows for a more deterministic behavior the debug buffer 52 for verification. The debug buffer 52 supports overflow detection such that an overflow interrupt can be generated.

The buffered stream of debug data is received by the debug frame encoder 54, of the debug data encoder 40, which frames the stream of debug data independent of establishing a video blanking period such that the multi-stream transmitter 22 can transmit the framed stream of debug data along with a framed stream of video data concurrently over a common lane of the main link 32. The debug frame encoder 54 flow rate from the debug buffer 52 is controlled according to the debug buffer 52 empty status which is conveyed to debug frame encoder 54 according to a BUFFER STATUS signal. The debug frame encoder 54 flow rate from the debug buffer 52 is also controlled according to a FLOW CONTROL signal from the multi-stream transmitter 22. When the multi-stream transmitter 22 signals a negative flow control to the debug frame encoder 54, the flow of the stream of debug data from the debug buffer 52 to the debug frame encoder 54 and subsequent frame encoding is suspended. When the multi-stream transmitter 22 signals a positive flow control to the debug frame encoder 54, the debug frame encoder 54 resumes flow of the stream of debug data for framing. The size of the debug buffer 52 can be designed to account for periods of negative flow control from the multi-stream transmitter 22 to ensure that there no loss in debug or performance data within the stream.

Figure 3:
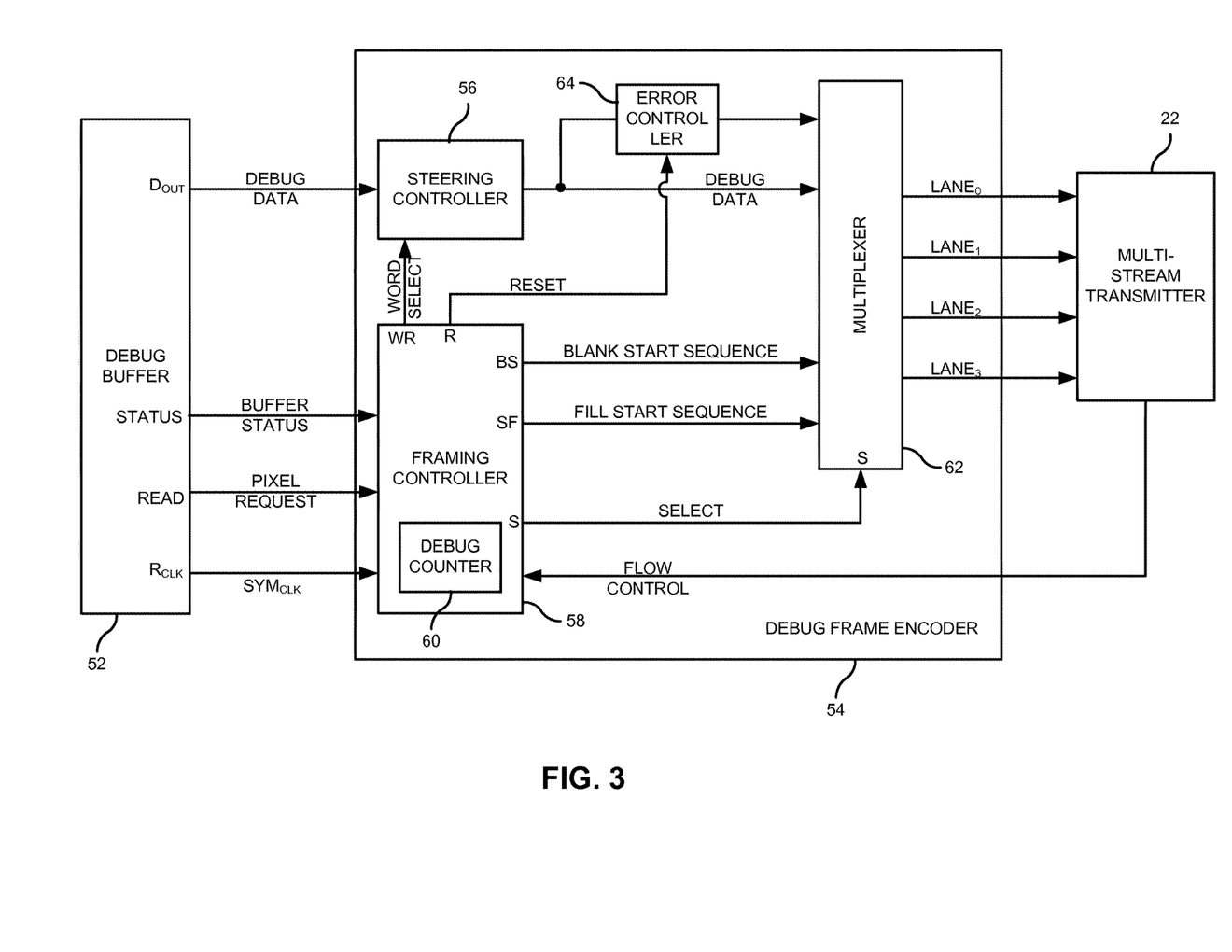
FIG. 3 illustrates another example of an integrated circuit, in accordance with some embodiments.

FIG. 3. Illustrates the debug frame encoder 54. To conserve bandwidth, the stream of debug data is framed with a limited number of control symbols to ensure compatibility with the multi-stream transport communication protocol. The control symbols do not convey actual data information. However, they allow the multi-stream receiver 42 of the second device 14 to identify a line boundary. Typically, video and/or audio data is transported via multi-stream transport across the data lanes which may include a number of control systems to define a video line, a video frame, secondary data, copy protection data, and the like. For example, a video frame is framed between a Blank End (BE) and Blank Start (BS) control symbol and secondary data, such as audio, is inserted there between.

The debug frame encoder 54 receives the buffered stream of debug data to a steering controller 56 which is configured to convert the bus width of the buffered stream of debug data. For example, if the buffered stream of debug data is 64 bits wide lane, the steering controller 56 steers the upper 32 bits first which is then followed by the lower 32 bits.

To optimize bandwidth, the debug data encoder 40 includes a framing controller 58 which frames the stream of debug data with a BS control symbol and, since there is no video data present in the stream of debug data, a video blanking period or interval is not established. The framing controller 58 inserts the BS control symbol at a predefined interval to define a line of debug data within the stream of debug data. The framing controller 58 includes a debug counter 60 which controls the length of the predefined line interval and thus the flow rate of the stream of debug data. The length of the predefined line interval is stored in a register of the framing controller 58 which can be manually or automatically adjusted, as previously described, to adjust the flow rate of the stream of debug data. The framing controller 58 generates a BS control symbol sequence and instructs a multiplexer 62 to insert a BS control symbol into the stream of debug according to the debug counter 60 for output to the multi-stream transmitter 22. Since the stream of debug data is framed in a line by line basis, each line start is indicated by the BS control symbol, i.e. it is the first control symbol of the line. The current line is ended by the start of a new line indicated by the inserted BS control symbol at the predefined interval.

The debug data encoder 40 is configured to insert fill start (SF) control symbols into the stream of debug data when the debug buffer 52 is empty, i.e. no debug data is available to stream. The FS controls symbols pad the stream of debug data between the BS intervals with non-data to ensure the intervals remain constant and to sustain flow rate of the stream of debug data. The framing controller 58 generates the FS control symbol and instructs a multiplexer 62 to insert the FS control symbol into the stream of debug according to the BUFFER STATUS signal from the debug buffer 52. If the debug buffer 52 is empty, the framing controller will instruct the multiplexer 62 to select the FS sequence to output to the multi-stream transmitter 22 for multi-stream transport. When the flow rate of the obtained stream of debug data falls below the established link rate of the multi-stream transmitter 22 the FS control symbols will make up the data for the line.

To ensure integrity of the data, the debug frame encoder 54 is configured to generate an error correction code frame before each inserted BS control frame. The debug frame encoder 54 includes an error controller 64 which analyzes each line of the stream of debug data, i.e. between BS adjacent symbols, and generates an error correction code based on the analyzed stream. The framing controller 58 instructs the multiplexer 62 to insert the generated error correction code into an error correction frame that is inserted directly preceding the latter BS control symbol corresponding to the line of analyzed stream of debug data. The error correction code can be generated according to any number of error correction and/or detection scheme including, but not limited to, a cyclic redundancy check (CRC), a Reed-Solomon (RS) error correction code, a hash function, a checksum function, parity bits, and the like.

Figure 4:
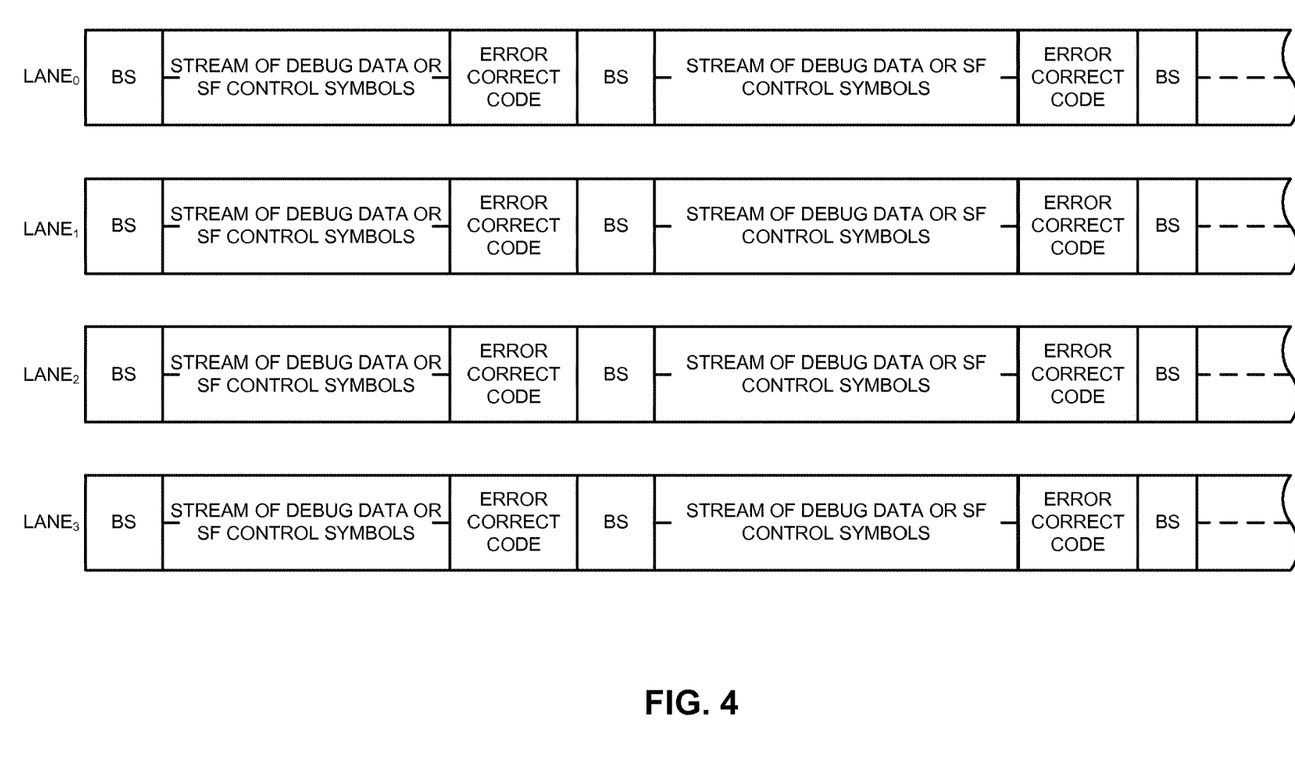
FIG. 4 is a diagram illustrating pictorially framing of a stream of debug and/or performance data, in accordance with some embodiments.

FIG. 4 illustrates an example of the framed stream of debug data encoded by the multi-stream transmitter 22 for multi-stream transport across 4 lanes of the main link 32 to the second device 14. As previously stated, each line of the stream of debug data starts with a BS control symbol, followed by the stream of debug data or FS control symbols (if debug data not present), and concluding with the error correction frame proceeding the stream of debug data.

Returning to FIG. 1, the framed stream debug data of FIG. 4 is transmitted via a multi-stream transport protocol to the second device 14. The framed stream debug data is received at the main link 70 of the second device's 14 physical layer PHY 72. After the HPD 74 signals the first device 12 of a connection to the second device 14, the EDID 38 is transmitted via the AUX channel 76 to the first device 12 and the link rate between the first device 12 and second device 14 is determined by the multi-stream transmitter 22 of the first device 12. The determined link rate is communicated to the debug data encoder 40 and subsequently the debug frame encoder 54 to determine the length of the line interval between adjacent BS frames. Once the flow rate and corresponding line interval is determined, the debug data encoder 40 instructs the communication bridge 20 to obtain the stream of debug and/or performance data from the debug bus 50.

The first device 12 includes a video stream source 80 which generates a stream of video data concurrently with obtaining of the stream of debug data. The multi-stream transmitter 22 receives both the stream of video data and the framed stream of debug data concurrently. The multi-stream transmitter frames the stream of video data for multi-stream transport across the main link 32 to the second device 14 whereas the stream of debug data has been already framed by the debug data encoder 40. In some embodiments, the multi-stream transmitter 22 transmits the framed debug data alone across the main link 32 to the second device. In some embodiments, the multi-stream transmitter 22 encodes the framed stream of video data and framed stream of debug data for concurrent multi-stream transport across the main link 32 to the second device 14. More so, the encoded framed stream of video and debug data can be transmitted concurrently across one data lane of the main link 32.

Figure 5:
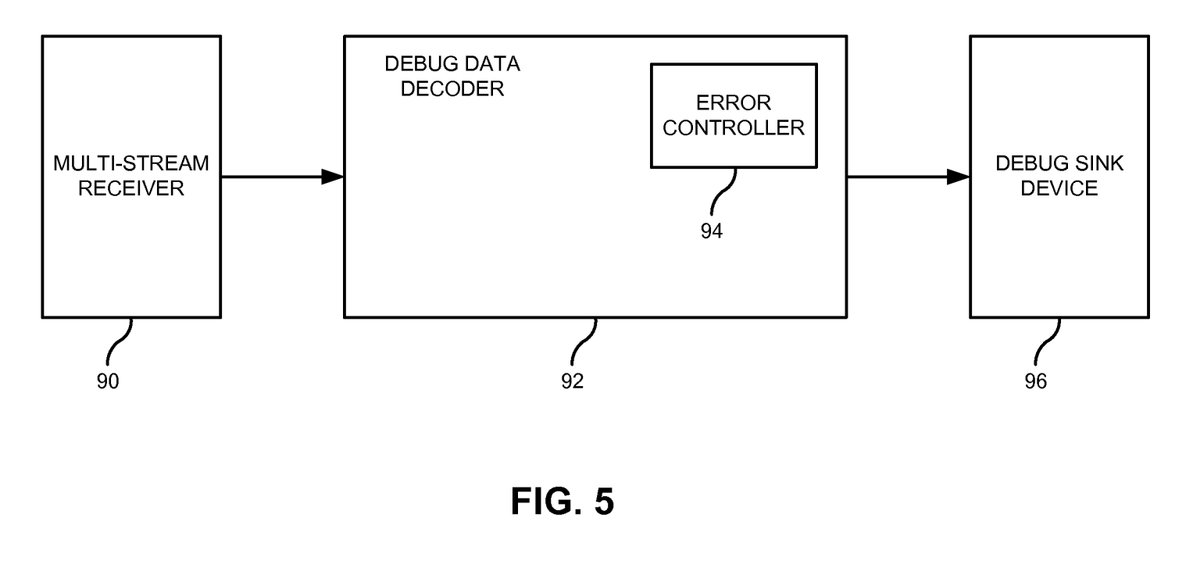
FIG. 5 illustrates another example of an integrated circuit, in accordance with some embodiments.

With reference to FIG. 5, the multi-stream transport of the framed stream of debug data and/or framed stream of video data are received by a multi-stream receiver 90 via the main link 70. The multi-stream receiver decodes the encoded framed stream of debug data and framed stream of video data into separate streams. The framed stream of debug data is received by a debug data decoder 92. The debug data decoder 92 includes an error controller 94 which determines an error correction code for each line of the stream of debug data and compares the determined error correction code with the error correction code transmitted with the framed stream of debug data. If the error correction codes match, then the integrity of that line of debug data is marked as valid and transmitted to a debug data sink device 96. If the error correction codes do no match, the corresponding line of debug data is marked as invalid and is discarded. The debug data sink device 96 is configured to adjust of the link interval of the debug data encoder 40 according to the number of invalid lines of the stream of debug data. For example, if a large number of lines are consistently marked invalid, the line interval can be adjust to be shorter and thus reducing the flow rate of the framed stream of debug data. The adjustment can be performed iteratively until a threshold is met wherein a sufficient number of lines of the stream of debug data are marked valid. Vice versa, the debug data sink device 96 can iteratively increase the line interval until a threshold of invalid lines of the stream of debug data is detected and thus maximizing the flow rate of the framed stream of debug data.

Validated lines of the stream of debug data decoded by the debug data decoder 92 independent of the framing. The control symbols, i.e. BS and FS, are discarded and the valid lines of debug data are received by the debug data sink device 96. The framed stream of video data is decoded by the multi-stream encoder according to the framing. Each frame of video data is then supplied to a video sink device 98 for display to a user.

Figure 6:
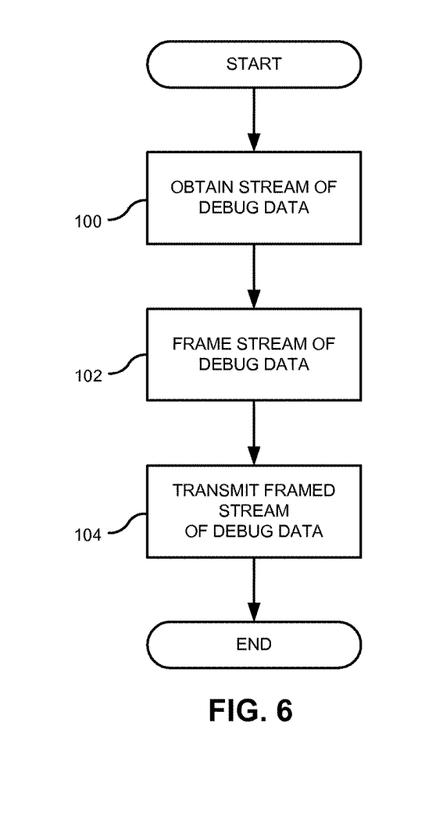
FIG. 6 is a flowchart illustrating one example of a method for operating a video device, in accordance with some embodiments.

FIG. 6 illustrates one example of a method for operating a video device having data lanes, which may be carried out, for example, by the first device 12 or any other suitable structure. As shown, the method includes obtaining a stream of debug data 100, framing the stream of debug data 102, and transmitting the framed stream of debug data 104 to a second device, e.g. the second device 14.

Figure 7:
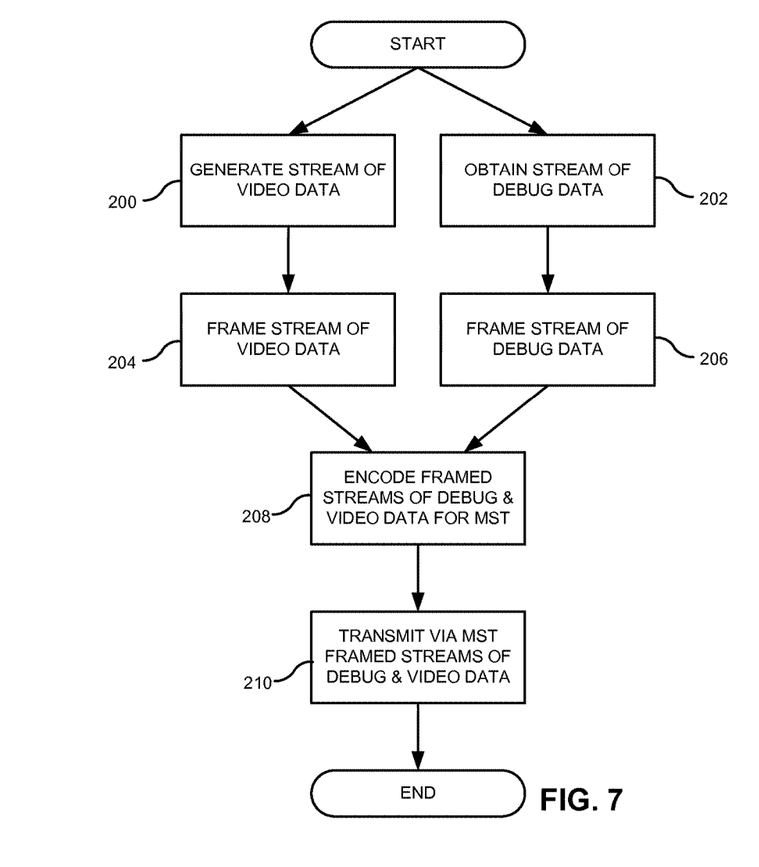
FIG. 7 is a flowchart illustrating another example of a method for operating a video device, in accordance with some embodiments.

FIG. 7 illustrates another example of a method for operating a video device having data lanes, which may be carried out, for example, by the first device 12 or any other suitable structure. As shown, the method includes generating a stream of video data 200 and obtaining a stream of debug data 202, framing the stream of video data 204 and framing the stream of debug data 206, encoding the framed streams of debug & video data for MST 208, and transmitting via MST the framed streams of debug & video data 210 to a second device, e.g. the second device 14.

Figure 8:
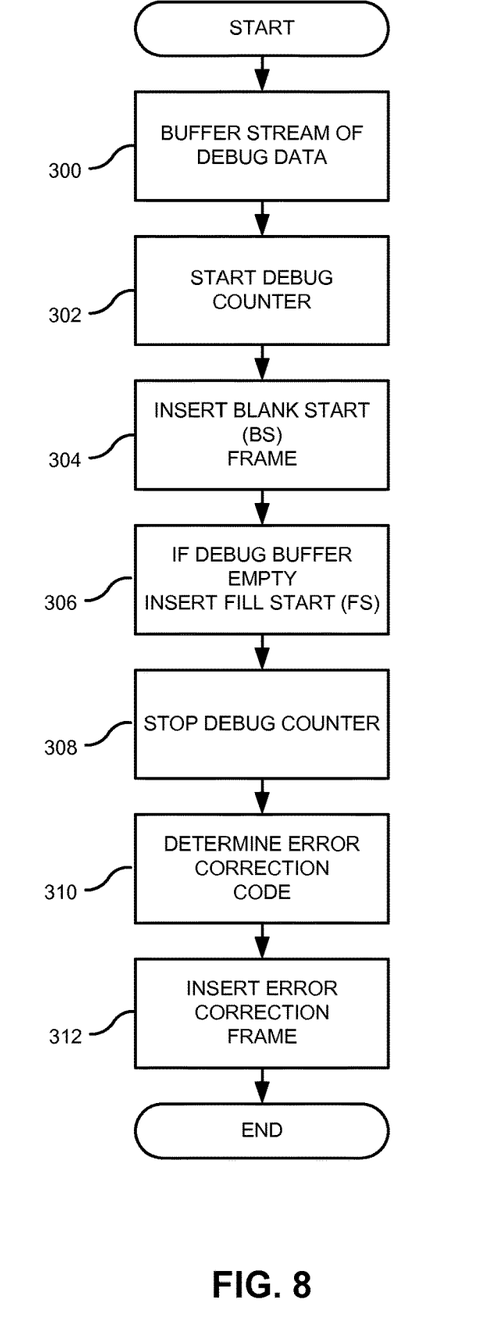
FIG. 8 is a flowchart illustrating another example of a method for operating a video device, in accordance with some embodiments.

FIG. 8 illustrates another example of a method for operating a video device having data lanes, wherein the step of framing the debug data 102, 206 further includes receiving the stream of debug data into a debug buffer 300, starting a debug counter 302, inserting a BS frame 304, inserting FS frames if the debug buffer is empty 306, stopping the debug counter 308, determining the error correction code of the corresponding line of the stream of debug data 310, and inserting an error correction frame with the error correction code into the stream of debug data 312.

Figure 9:
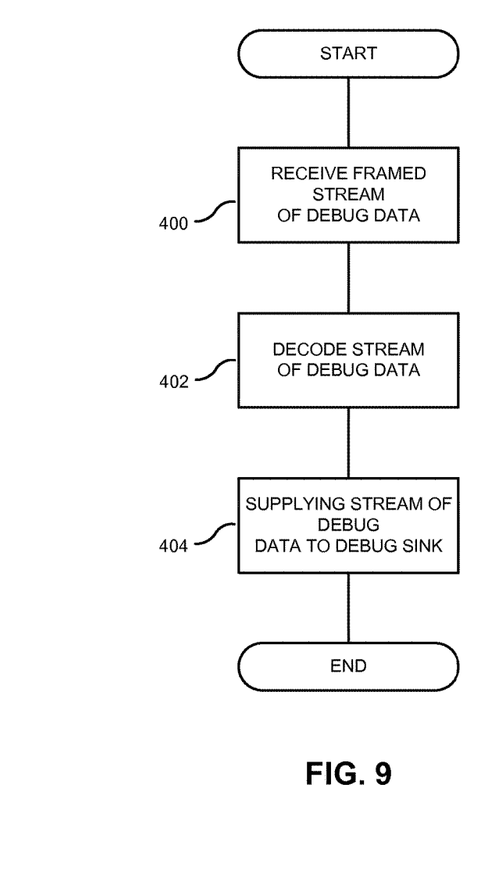
FIG. 9 is a flowchart illustrating another example of a method for operating a video device, in accordance with some embodiments.

FIG. 9 illustrates another example of a method for operating a video device having data lanes, which may be carried out, for example, by the second device 14 or any other suitable structure. As shown, the method includes receiving a framed stream of debug data 400, decoding the framed stream of debug data 402 to a stream of debug data, and supplying the stream of debug data to a debug sink device 404.

Figure 10:
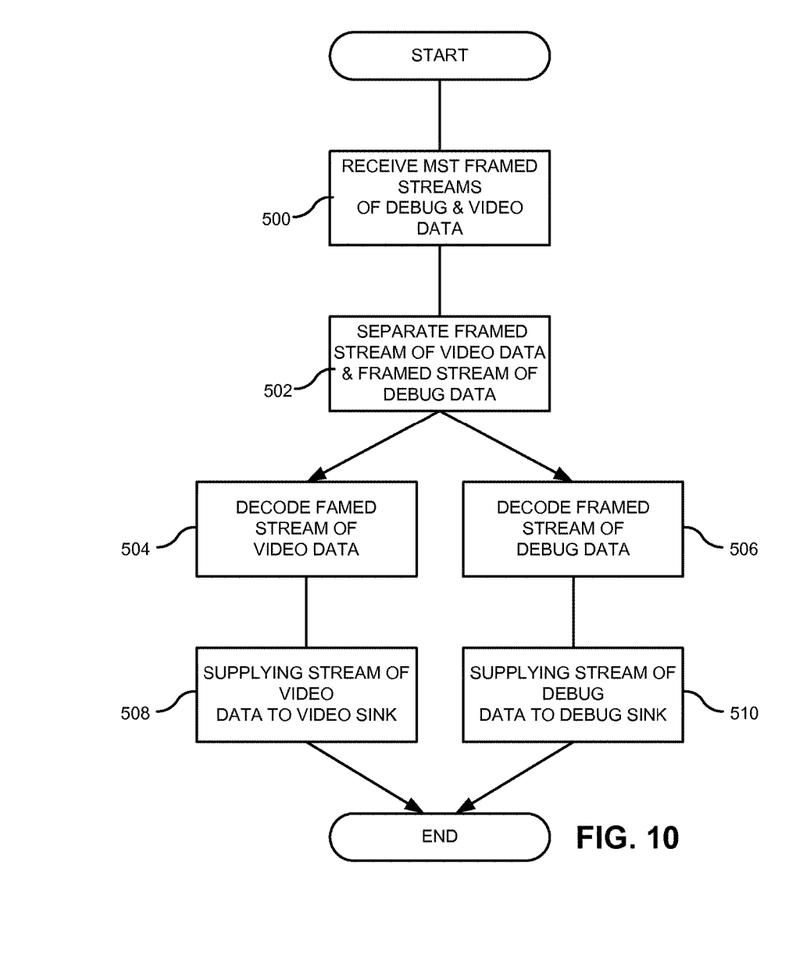
FIG. 10 is a flowchart illustrating another example of a method for operating a video device, in accordance with some embodiments.

FIG. 10 illustrates another example of a method for operating a video device having data lanes, which may be carried out, for example, by the second device 14 or any other suitable structure. As shown, the method includes receiving an MST framed stream of debug & video data 500, separating the framed stream of debug data and the framed stream of video data 502, decoding the framed stream of video data 504 to a stream of video data, decoding the framed stream of debug data 506 to a stream of debug data, supplying the stream of video data to a video sink device 508, and supplying the stream of debug data to a debug sink device 510.

Figure 11:
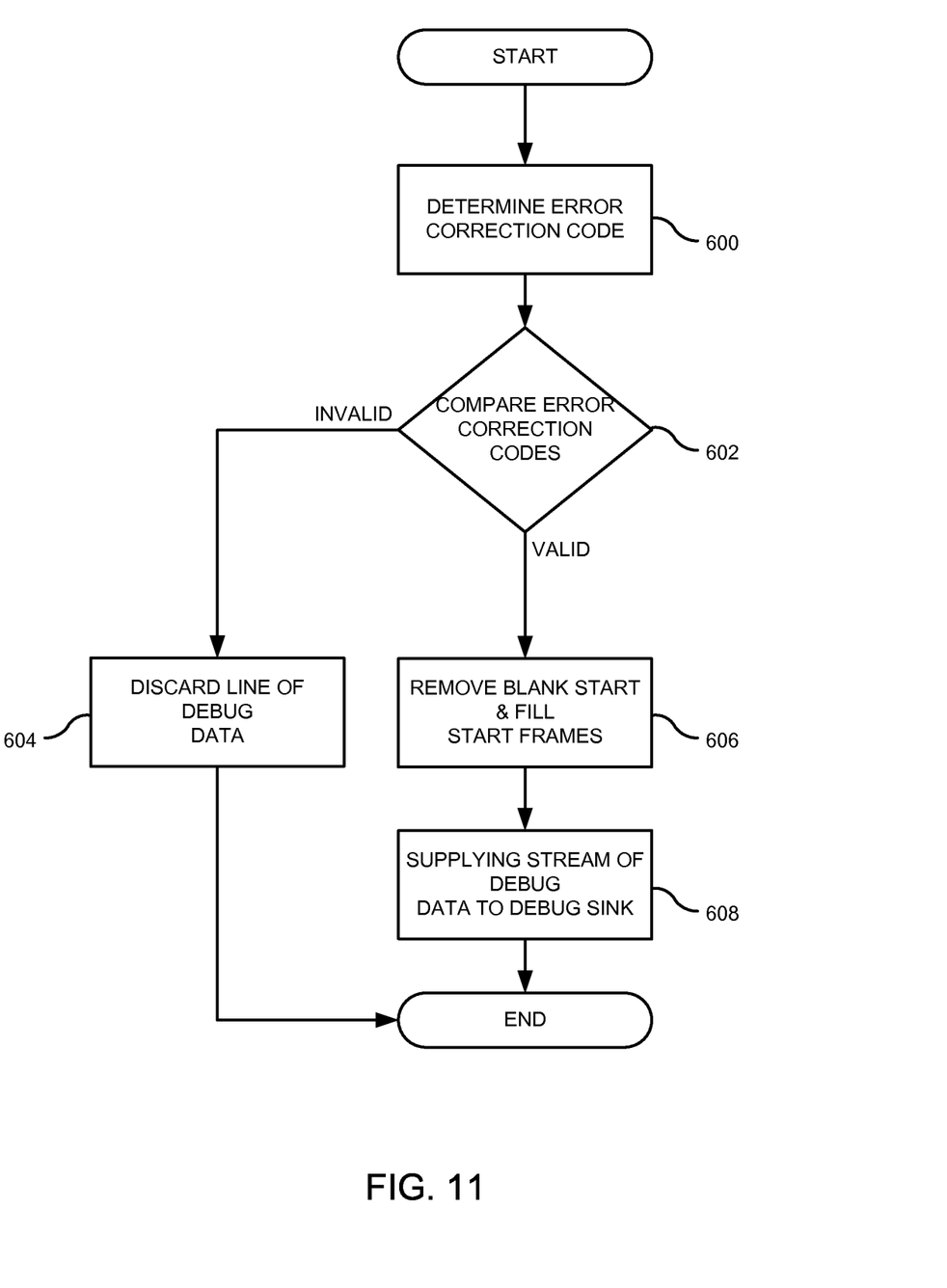
FIG. 11 is a flowchart illustrating another example of a method for operating a video device, in accordance with some embodiments.

FIG. 11 illustrates another example of a method for operating a video device having data lanes, which may be carried out, for example, by the second device 14 or any other suitable structure. As shown, wherein the step of decoding the framed stream of debug data 402, 506 includes determining an error correction code 600 for a corresponding line of the stream of debug data, comparing the determined error correction code with the transmitted error correction code within the error correction frame of the corresponding line 602, if the error correction code is invalid then the corresponding line of debug data is discarded 604, if the error correction code is valid then the corresponding control symbols BS and FS are removed 606 and the stream of debug data is supplied to a debug sink device 608.

The software operations described herein can be implemented in hardware such as discrete logic fixed function circuits including but not limited to state machines, field programmable gate arrays, application-specific circuits or other suitable hardware. The hardware may be represented in executable code stored in non-transitory memory such as RAM, ROM or other suitable memory in hardware descriptor languages such as, but not limited to, RTL and VHDL or any other suitable format. The executable code when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer-readable medium such as, but not limited to, CDROM, RAM, other forms of ROM, hard drives, distributed memory, etc. The instructions may be represented by any suitable language such as, but not limited to, hardware descriptor language (HDL), Verilog or other suitable language. As such, the logic, software and circuits described herein may also be produced as integrated circuits by such systems using the computer-readable medium with instructions stored therein. For example, an integrated circuit with the aforedescribed software, logic and structure may be created using such integrated circuit fabrication systems. In such a system, the computer readable medium stores instructions executable by one or more integrated circuit design systems that cause the one or more integrated circuit design systems to produce an integrated circuit.

Among other advantages, the apparatus and methods transmit the debug and/or performance data in real-time via MST over a unified main data link concurrently with video and/or audio data corresponding to the debug and/or performance data without modifying existing MST architecture or data link cables. Another advantage relies in that a limited number of control symbols are used to frame the debug and/or performance data in order to optimize bandwidth and improve latency. Another advantage relies in that error correction data can be inserted or embedded in the MST debug and/or performance data in lieu of the unused control symbols. The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

What is claimed is:

1. A method of operating a video device comprising:
    obtaining, by the video device, a stream of debug data in response to a test operation during a debug mode of the video device;
    framing, by the video device, the stream of debug data with control symbols that do not establish a video blanking period for the debug data;
    generating, by the video device, a stream of video data related to the test operation;
    framing, by the video device, the stream of video data with control symbols that establish a video blanking period; and
    transmitting, by the video device, the framed stream of debug data across one or more data lanes of a video link, wherein the transmitting comprises transmitting the framed stream of debug data that includes control symbols that do not establish a video blanking period concurrently with the framed stream of video data across the one or more data lanes of the video link.

2. The method according to claim 1, wherein the framed stream of debug data and the framed stream of video data are transmitted on a common data lane of the video link.

3. The method according to claim 1, wherein the framing the stream of debug data includes:

receiving the stream of debug data into a debug buffer;
    inserting a blank start frame into the stream of debug data at a predefined interval; and
    inserting a fill start frame to occupy each empty frame between a blank start frame and the stream of debug data.

4. The method according to claim 3, wherein framing the stream of debug data includes:
    generating error correction code based on a line of debug data between an adjacent pair of blank start frames; and
    inserting an error correction frame with the generated error correction code into the stream of debug data before the blank start frame of the corresponding line.

5. The method according to claim 1, wherein transmitting the framed stream of debug data includes:
    encoding the framed stream of debug data with the framed stream of video data for multi-stream transport across a common data lane of the video link.

6. The method according to claim 1, wherein the framed stream of debug data is transmitted in real time across the one or more data lanes of the video link.

7. A method of operating a video device comprising:
    receiving, by the video device, a framed stream of video data that is formed with control symbols that establish a video blanking period concurrently with receiving a framed stream of debug data across one or more data lanes of a video link for operation between a video source device and a video sink device, the stream of debug data being framed with control symbols that do not establish a video blanking period;
    decoding, by the video device, the framed stream of debug data independent of the framing;
    decoding, by the video device, the framed stream of video data;
    supplying the decoded stream of debug data to a debug sink device; and
    supplying the decoded stream of video data to a video sink device.

8. The method according to claim 7, wherein the framed stream of debug data and the stream of video data are received on a common data lane of the video link.

9. The method according to claim 7, wherein decoding the stream of debug data includes:
    removing blank start frames from the stream of debug data; and
    removing each fill start frame occupying each empty frame between a blank start frame and the stream of debug data.

10. The method according to claim 7, wherein decoding the framed stream of debug data include:
    decoding a multi-stream transport across a common data lane of the video link into a separate stream of framed debug data and a separate framed stream of video data; and
    supplying the stream of video data to a video sink device and the stream of debug data to a debug sink device.

11. The method according to claim 10, wherein decoding the stream of debug data includes:
    receiving an error correction frame inserted into the stream of debug data before each inserted blank start frame, the error correction frame being associated with an error correction code generated based on a line of debug data between the corresponding blank start frame and a directly preceding blank start frame;
    determining an error correction code of the corresponding line of debug data; and comparing the determined error correction code and the received error correction code.

12. The method according to claim 7, wherein the framed stream of debug data is received in real time across the one or more data lanes of the video link.

13. A video device comprising:
a circuit configured to obtain a stream of debug data in response to a test operation during a debug mode of the video device;
a debug data encoder configured to frame the stream of debug data with control symbols that do not establish a video blanking period for the debug data;
a video source configured to generate a stream of video data related to the test operation wherein the video data is framed with control symbols that establish a video blanking period; and
a multi-stream transmitter configured to transmit the framed stream of debug data across one or more data lanes of a video link and to transmit the framed stream of debug data concurrently with the framed stream of video data across the one or more data lanes of the video link, wherein the multi-stream transmitter is configured to receive the stream of video data with control symbols that establish the video blanking period.

14. The video device according to claim 13, wherein the framed stream of debug data and the framed stream of video data are transmitted on a common data lane of the video link.

15. The video device according to claim 13, wherein the debug data encoder is configured to frame the stream of debug data by:
receiving the obtained stream of debug data into a debug buffer;
inserting a blank start frame into the stream of debug data at a predefined interval; and
inserting a fill start frame to occupy each empty frame between a blank start frame and the stream of debug data.

16. The video device according to claim 15, wherein the debug data encoder is further configured to frame the stream of debug data by:
generating error correction code based on a line of debug data between an adjacent pair of blank start frames; and
inserting an error correction frame with the generated error correction code into the stream of debug data before the blank start frame of the corresponding line.

17. The video device according to claim 13, wherein the multi-stream transmitter is configured to transmit the framed debug data by:
receiving a stream of video data related to the test operation;
framing the received stream of video data to establish a video blanking period; and
encoding the framed stream of debug data with the framed stream of video data for multi-stream transport across a common data lane of the video link.

18. The video device according to claim 13, wherein the debug data encoder is configured to frame the stream of debug data and the multi-stream transmitter is configured to transmit the framed stream of debug data in real time across the one or more data lanes of the video link.

19. A video device comprising:
a multi-stream receiver configured to receive a framed stream of debug data generated during a debug mode, across one or more data lanes of a video link for operation between a video source device and a video sink device, the framed stream of debug being framed with control symbols that do not establish a video blanking period and configured to concurrently receive a framed stream of video data that is framed with control symbols that establish a video blanking period;
a debug data decoder configured to decode the framed stream of debug data independent of the framing and supply the stream of debug data to a debug data sink device; and
a decoder operative to decode the framed stream of video data according to an established video blanking period, and supply the decoded stream of video data to a video sink device.

20. The video device according to claim 19, wherein the framed stream of debug data and the framed stream of video data are received on a common data lane of the video link.

21. The video device according to claim 19, wherein the debug data decoder is configured to decode the framed stream of debug data via:
removing any blank start frames from the stream of debug data; and
removing each fill start frame occupying each empty frame between a blank start frame and the stream of debug data.

22. The video device according to claim 19, wherein the multi-stream receiver is configured to decode the framed stream of debug data via:
decoding a multi-stream transport across a common data lane of the video link into a separate framed stream of debug data and a separate framed stream of video data;
decoding a framed stream of video data into a stream of video data according to an established video blanking period; and
supplying the decoded stream of video data to a video sink device and the framed stream of debug data to a debug data decoder.

23. The video device according to claim 22, wherein the debug data decoder is configured to decode the framed stream of debug data via:
receiving an error correction frame inserted into the stream of debug data before each inserted blank start frame, the error correction frame being associated with an error correction code generated based on a line of debug data between the corresponding blank start frame and a directly preceding blank start frame;
determining an error correction code of the corresponding line of debug data; and
comparing the determined error correction code and the received error correction code.

24. The video device according to claim 19, wherein the framed stream of debug data is received in real time across the one or more data lanes of the video link.

* * * * *